United States Patent [19]

Yoda et al.

[11] Patent Number: 5,714,106

[45] Date of Patent: Feb. 3, 1998

[54] PROCESS OF PRODUCING A DEVICE INCLUDING A MOLDED-IN INSERT AND FLUOROPLASTIC SURFACING MATERIAL

[75] Inventors: Yasuo Yoda; Akihiko Hirota; Masanori Aoki, all of Yokohama; Hitoshi Oda, Kawasaki, all of Japan

[73] Assignee: Nichias Corporation, Tokyo, Japan

[21] Appl. No.: 366,304

[22] Filed: Dec. 29, 1994

[30] Foreign Application Priority Data

Dec. 29, 1993 [JP] Japan .................. 5-349749

[51] Int. Cl.[6] .................. B29C 45/14; B29C 45/36
[52] U.S. Cl. .................. 264/275; 264/271.1; 264/279.1; 249/91
[58] Field of Search .................. 264/272.11, 272.15, 264/272.17, 275, 277, 259, 271.1, 279.1, 279; 249/91

[56] References Cited

U.S. PATENT DOCUMENTS

| Re. 29,332 | 8/1977 | Bilbro et al. | 264/271.1 |
|---|---|---|---|
| 3,834,458 | 9/1974 | Bilbro et al. | 264/271.1 |
| 4,671,746 | 6/1987 | Sessody | 264/279.1 |
| 4,824,627 | 4/1989 | Hammer et al. | 264/275 |
| 4,876,915 | 10/1989 | Iuchi | 264/275 |
| 4,927,675 | 5/1990 | Adams et al. | 428/35.9 |
| 4,957,677 | 9/1990 | Katoh et al. | 264/275 |
| 5,100,311 | 3/1992 | Clemens et al. | 249/91 |

FOREIGN PATENT DOCUMENTS 61-134212  6/1986  Japan .................. 249/91

*Primary Examiner*—Angela Y. Ortiz
*Attorney, Agent, or Firm*—Cushman Darby & Cushman IP Group of Pillsbury Madison & Sutro LLP

[57] ABSTRACT

A process is provided for making a fluoroplastic molded-in insert without any supplementary production steps. A predetermined number of polytetrafluoroethylene bearers support a core material apart from the surface of a mold by a space equal to the desired thickness of a surfacing material to be formed on the surface of the core material. After disposing the bearers between a mold surface and the core material, hot-melt fluoroplastics are molded so as to combine the core material, the bearers and the hot-melt fluoroplastics into one unit. As a result, the core material is completely and simultaneously embedded when hot-melt fluoroplastics are molded.

6 Claims, 1 Drawing Sheet

PROCESS OF PRODUCING A DEVICE INCLUDING A MOLDED-IN INSERT AND FLUOROPLASTIC SURFACING MATERIAL

BACKGROUND OF THE INVENTION

1. Field of the Invention

The present invention relates to a process for manufacturing devices having molded-in inserts and a fluoroplastic surfacing material.

2. Description of the Related Art

Fluoroplastics generally exhibit excellent properties with respect to heat resistance, chemical resistance, electrical insulation, and friction coefficients. A group of fluoroplastics known as and hereinafter referred to as hot-melt fluoroplastics not only possess the above-mentioned properties associated with fluoroplastics, but also exhibit exquisite moldability which allows the fluoroplastics to be molded under generally known thermoplastic resin molding methods using compression, injection and transfer molding techniques. However, the molded material thus obtained possesses an extremely low modulus of elasticity and strength at temperatures exceeding about 150° C. Moreover, at similarly high temperatures, the molded material is prone to irreversible deformation while a load is being applied thereto.

The foregoing problems attributed to molded hot-melt fluoroplastic materials can be overcome by embedding a material such as a metal or so-called engineering plastics exhibiting stable physical properties in a wide temperature range in the core portion of the molded material. In this manner, a surfacing material can be molded around and reinforce the molded-in insert.

Several conventional methods have been practiced for making molded-in inserts with hot-melt fluoroplastics as a surfacing material. For example, according to one method, a core material that has been formed to shape is prepared. A plurality of members can be assembled into such a core material, if necessary. A fluoroplastic surfacing material is separately molded in the form of a plurality of divided pieces beforehand, which are subsequently combined together to cover the whole surface of the core material. The divided pieces then are united by welding.

This first method is disadvantageous insofar as it requires a large number of production steps, which necessitates a time-consuming production operation. In addition, the swollen weld zone blemishes the external appearance of the surfacing material and tends to impair the surfacing material strength, durability, and sealability. This conventional method has the further disadvantage of providing poor adhesion between the core material and the fluoroplastic surfacing material.

According to a second conventional method, a core material is placed in and directly mounted on the surface (bottom force) of a metal mold cavity. Fluoroplastic powder or pellets then are loaded around the core material. Next, a compressed molded-in insert is obtained through heating, pressurizing and cooling steps. However, because fluoroplastic material is not introduced between the core material and the mold cavity, a surface of the core is not covered with the fluoroplastic surfacing material in this method. Therefore, it is necessary to cover this exposed surface with a molded fluoroplastic material layer and secure the layer thereto by welding.

According to a third conventional method, metal bearers are used to support a hot-melt fluoroplastic core material in a metal cavity. The bearers are removed after the molding operation is terminated and the holes produced then are filled up with the fluoroplastics used during the molding operation before being processed by welding. However, as with the preceding two conventional methods, a welding step is ultimately required under this method. Moreover, an attempt to minimize the number of removable bearers can cause the core material to become supported insufficiently, thus causing the core material to undergo positional slippage due to the flow of the plastics during the molding operation or deformation because of the intense molding pressure.

SUMMARY OF THE INVENTION

In view of the foregoing drawbacks inherent to the prior art, it is an object of the present invention to provide a process for manufacturing a device including fluoroplastic molded-in inserts of high quality and efficiency in productivity.

It is another object of the present invention to provide a process for embedding a core material while simultaneously molding a hot-melt fluoroplastic surfacing material, thereby obviating the need for any time-consuming welding work after the molding operation is terminated.

A process for making a molded-in insert with hot-melt fluoroplastics as a surfacing material according to the present invention is practiced by inserting a core material into a mold cavity and supporting the core material apart from the surface of the mold cavity. The bearers space the core material apart from the mold cavity by a distance that defines the thickness of the surfacing material to be formed on the surface of the core material. This spacing is accomplished by disposing bearers of polytetrafluoroethylene between the mold and the core material. Next, the mold cavity is filled with molten fluoroplastics. The molten fluoroplastics are then cooled and solidified under pressure in order to combine the bearers and the hot-melt fluoroplastics into a unit.

Generally, any hot-melt fluoroplastic can be used to carry out molding in accordance with the present invention. Further, any well-known molding technique, including compression, injection, and transfer molding techniques can be practiced for molding the hot-melt fluoroplastics. Exemplary fluoroplastics include perfluoroalkoxy fluoroplastics (PFA), ethylene tetrafluoride propylene hexafluoride copolymer (FEP), ethylene tetrafluoride ethylene copolymer (ETFE), polychlorotrifluoroethylene (PCTFE), vinylidene fluoride (PVDF) and so forth.

The core material selected should be determined with reference to the performance required for the molded product. Any engineering plastic having improved physical properties can be selected. Among preferred materials are polyetherether ketone, polyphenylene sulfide, polyether imide and so on, in addition to stainless steel and other metal materials.

No special molding cavities are required.

The polytetrafluoroethylene bearers are positioned between the core material and the mold cavity such that when the core is inserted into the mold cavity, the core material does not contact the surface of the mold cavity. As a result, the fluoroplastic surface layer can be formed therebetween. As the softening temperature of polytetrafluoroethylene is generally far higher than the molding temperature of the hot-melt fluoroplastic, the bearers are not softened and deformed during the molding, but support the core material in position until the termination of the molding operation. The bearers and the core material are thereby embedded in the fluoroplastics when the molding operation is terminated. Only the distal end surface of the bearers, which are maintained in contact with the mold cavity surface during molding, appear on the surface of the resulting molded device.

The dimension, quantity, and shape of the bearers are determined in accordance with the desired shape of the core material and the thickness of the fluoroplastic layer to be formed on the surface of the core material. It is preferred to firmly couple the bearers to the core material by screwing or fitting the former into the latter to prevent the former from slipping out of position or separating from the latter.

Since the bearers, which are embedded together with the core material, are made of polytetrafluoroethylene which is a kind of fluoroplastic, they adhere to and combine completely with the surrounding hot-melt fluoroplastics. No uneven surfaces or interfaces are formed at the areas between the bearers and the surfacing material. The presence of the bearers is only made recognizable by a difference in the tone of color. Needless to say, the surface properties such as chemical resistance at the adjoining surfaces are less likely to deteriorate.

DESCRIPTION OF THE PREFERRED EMBODIMENTS

An embodiment of the present invention will subsequently be described by reference to specific examples.

EXAMPLE 1

Figure 1:
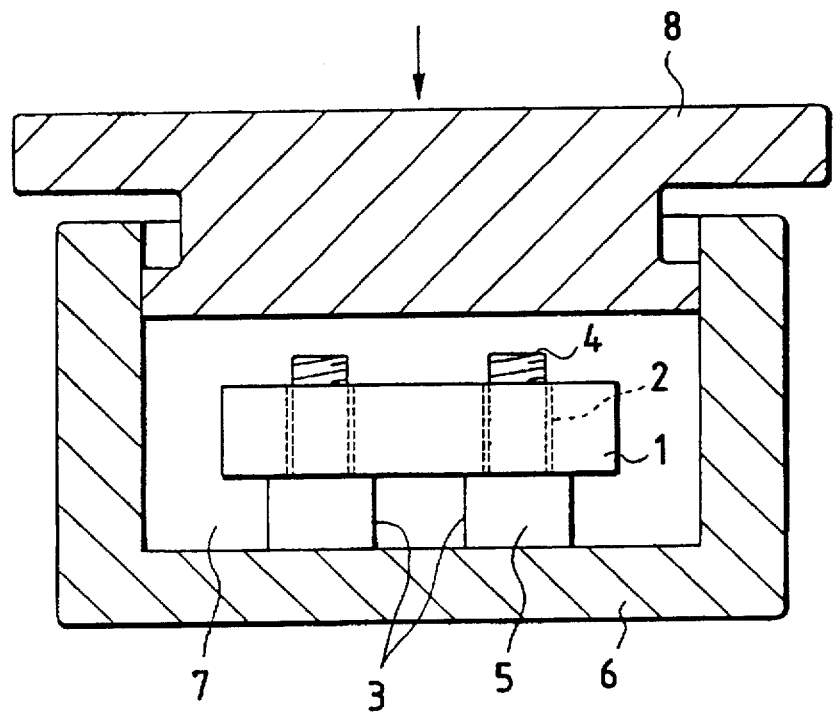
FIG. 1 is an explanatory drawing of Example 1.

Referring to FIG. 1, a description will be given of an example for compression molding a rectangular, plate-like part in accordance with the present invention. The part is formed of a stainless plate material as a core material and a hot-melt fluoroplastic surfacing material. The core has four circular through-holes.

A hole 2 having a diameter sufficiently larger than that of the through-hole required is bored and threaded beforehand in the predetermined places of a core-material 1. Each of the polytetrafluoroethylene bearers 3 is formed to have a bolt-like appearance and a threaded section 4 which engages a respective threaded hole 2 of the core material 1. The bearer 3 is secured to the core material 1 by screwing the threaded section 4 into the threaded hole 2. The core material 1 then is placed into a mold 6 (the bottom force thereof) with the projected head section 5 of the bearer 3 disposed between the core material 1 and the contacting surface of the mold 6. That is, the core material 1 is spaced apart from the mold 6 by the thickness of the head section 5 of the bearer 3. Only the distal end faces (unnumbered) of the bearers 3 contact the mold 6.

A necessary amount of hot-melt fluoroplastics in the form of pellets is divided in two halves. One-half is disposed into the mold cavity 7 before the core material 1 is set therein. The other half is disposed into the mold after the core material 1 is set in the mold cavity 7, thereby filling cavity 7 with resin pellets.

A hold-down plate 8 compresses the contents of the cavity 7 while the whole mold is heated to a necessary molding temperature so that the molten resin is evenly distributed throughout the cavity 7. Then the resin is caused to dissipate heat and solidify while cold-pressed.

After the molded material is removed from the mold 6, the core material 1 is covered completely with fluoroplastics. Since the bearers 3 have been embedded in the portions where the respective through-holes are required, holes having a predetermined diameter are bored therein. Because the bearers 3 have a larger diameter than the through-holes, an annular radially-outer portion of each bearer 3 remains to cover the wall of the hole 2 even after the boring work is done. Finally, the edge faces are finished by cutting, for example.

EXAMPLE 2

Figure 2:
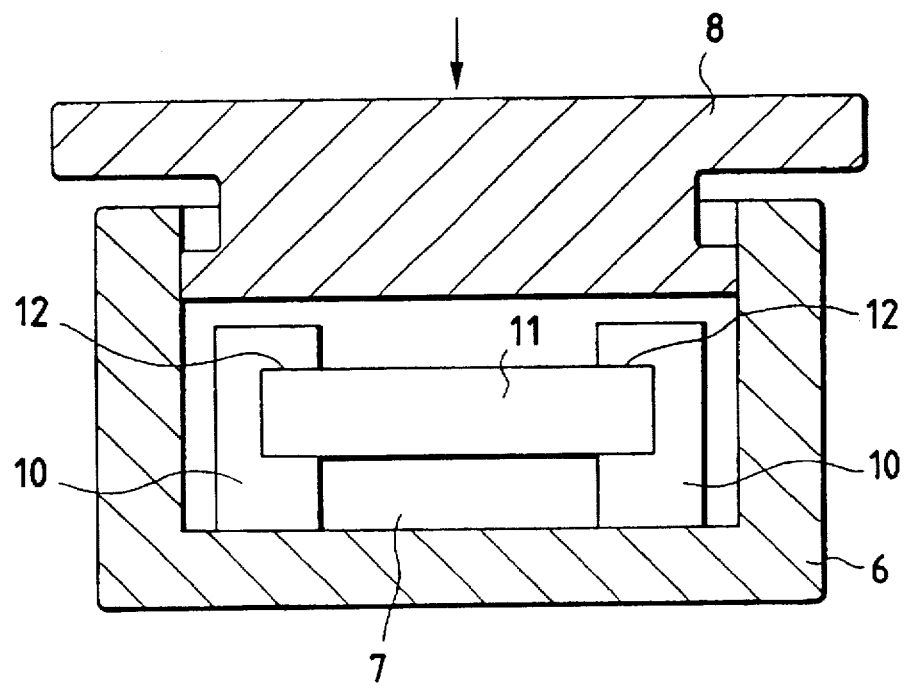
FIG. 2 is an explanatory drawing of Example 2.

Referring to FIG. 2, a description will subsequently be given of another example in which a rectangular parallelopiped part is compression-molded by means of a mold similar to what has been employed with reference to FIG. 1. The part is formed of a stainless steel plate as a core material and a hot-melt fluoroplastic surfacing material (like reference numerals designated like and corresponding members of FIG. 1).

In this case, bearers 10 of polytetrafluoroethylene are in the form of pillars respectively having U-shaped mating grooves 12. The width of the grooves 12 corresponds to the thickness of a core material 11. The core material 11 is supported by fitting its edge portions into the respective mating grooves 12.

When the hot-melt fluoroplastic is loaded and compression-molded as in the case of Example 1, there is produced a molded-in insert in which the core material 11 together with the bearers 10 are completely embedded therein.

As set forth above, the insert molding process is carried out with polytetrafluoroethylene bearers to ensure that the fluoroplastic layer strongly adheres to the surface of the core material. The bearers are encapsulated with the core material when the hot-melt fluoroplastic surfacing material is molded. Since the bearers thus embedded are made of the homogeneous fluoroplastics with respect to the hot-melt fluoroplastics, the bearers are completely incorporated into the surfacing material and therefore prevent the molded product from developing any defect with respect to external appearance and chemical properties. Moreover, the embedded bearers can be so arranged to securely and firmly engage the core member. Because the bearers are integrated into the resulting mold, concerns over restricting the number of bearers are negligible. It is also possible to minimize the potential for defective products resulting from the positional slippage and the deformation caused by intense pressure and the flow of plastics during the molding operation.

The above-discussed features of the present invention make it feasible to manufacture fluoroplastic molded-in inserts of excellent quality with greater efficiency.

What is claimed is:

1. A process for making a device including a molded-in insert and a hot-melt fluoroplastic surfacing material comprising the steps of:

providing the molded-in insert as a core;
connecting at least one bearer to the molded-in insert;
providing a mold cavity having an inner surface;
inserting the molded-in insert with the at least one bearer connected thereto into the mold cavity;
arranging the molded-in insert such that the at least one bearer spaces the molded-in insert apart from the inner surface of the mold cavity by a predetermined distance which defines a thickness of the surfacing material;
introducing the hot-melt fluoroplastic surfacing material into the mold cavity;

melting the hot-melt fluoroplastic material;

cooling and solidifying the hot-melt fluoroplastic material under pressure; and removing the at least one bearer, molded-in insert, and surfacing material from the mold cavity, wherein the at least one bearer and the molded-in insert are embedded in the hot-melt fluoroplastic surfacing material, and wherein the at least one bearer member is formed from polytetrafluoroethylene, the polytetrafluoroethylene having a softening temperature that is greater than a melting temperature of the hot-melt fluoroplastic.

2. A process according to claim 1, wherein the molded-in insert is made of a material selected from the group consisting of polyetherether ketone, polyphenylene sulfide, and polyether imide.

3. A process according to claim 1, wherein the molded-in insert is made of stainless steel.

4. A process according to claim 1, wherein the at least one bearer has a screw-threaded end that is received in a bore of the molded-in insert for practicing said connecting step.

5. A process according to claim 1, wherein the at least one bearer has a notched mating groove for connecting the molded-in insert thereto.

6. A process according to claim 1, wherein the hot-melt fluoroplastic is selected from the group consisting of perfluoroalkoxy fluoroplastics, ethylene tetrafluoride propylene hexafluoride copolymer, ethylene tetrafluoride ethylene copolymer, polychlorotrifluoroethylene, and vinylidene fluoride.

* * * * *